(12) United States Patent
Lub et al.

(10) Patent No.: US 11,274,253 B2
(45) Date of Patent: Mar. 15, 2022

(54) ACTUATOR DEVICE, ACTUATION METHOD AND MANUFACTURING METHOD

(71) Applicant: KONINKLIJKE PHILIPS N.V., Eindhoven (NL)

(72) Inventors: Johan Lub, Valkenswaard (NL); Nicolaas Petrus Willard, Valkenswaard (NL); Cornelis Petrus Hendriks, Eindhoven (NL); Karel Johannes Adrianus Van Den Aker, Liempde (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 142 days.

(21) Appl. No.: 16/332,854

(22) PCT Filed: Sep. 18, 2017

(86) PCT No.: PCT/EP2017/073388
§ 371 (c)(1),
(2) Date: Mar. 13, 2019

(87) PCT Pub. No.: WO2018/054799
PCT Pub. Date: Mar. 29, 2018

(65) Prior Publication Data
US 2019/0218458 A1 Jul. 18, 2019

(30) Foreign Application Priority Data

Sep. 21, 2016 (EP) .................................. 16189915
Feb. 28, 2017 (EP) .................................. 17158318

(51) Int. Cl.
*C09K 19/38* (2006.01)
*B32B 27/08* (2006.01)
(Continued)

(52) U.S. Cl.
CPC .......... *C09K 19/3852* (2013.01); *B29C 70/00* (2013.01); *B32B 7/023* (2019.01);
(Continued)

(58) Field of Classification Search
CPC ............ C09K 19/3852; C09K 19/3804; C09K 19/542; C09K 19/3833; C09K 19/24;
(Continued)

(56) References Cited

U.S. PATENT DOCUMENTS

2007/0215836 A1    9/2007   Van Bruggen et al.
2008/0258108 A1   10/2008   Broer et al.
(Continued)

FOREIGN PATENT DOCUMENTS

EP          2480630 B1      4/2014
JP    2007106945 A  *   4/2007
(Continued)

OTHER PUBLICATIONS

Translation to English of JP2007-106945 A via espacenet. accessed Mar. 17, 2021. (Year: 2007).*
(Continued)

*Primary Examiner* — Nancy R Johnson
(74) *Attorney, Agent, or Firm* — Schott, P.C.

(57) ABSTRACT

An actuator device comprises a stack formed from a plurality of photoresponsive layers, which deform in response to light, which are partitioned by respective deformable non-photoresponsive layers. The deformable non-photoresponsive layers guide light between and to the photoresponsive layers, and can follow the deformation of the photoresponsive layers.

19 Claims, 6 Drawing Sheets

(51) Int. Cl.
| | |
|---|---|
| *C09K 19/54* | (2006.01) |
| *B29C 70/00* | (2006.01) |
| *C09K 19/24* | (2006.01) |
| *C09K 19/20* | (2006.01) |
| *B32B 7/023* | (2019.01) |
| *F03G 7/00* | (2006.01) |
| *F03G 7/06* | (2006.01) |
| *H02N 11/00* | (2006.01) |
| *C09K 19/04* | (2006.01) |
| *C09K 19/34* | (2006.01) |

(52) U.S. Cl.
CPC .......... *B32B 27/08* (2013.01); *C09K 19/2007* (2013.01); *C09K 19/24* (2013.01); *C09K 19/3804* (2013.01); *C09K 19/3833* (2013.01); *C09K 19/542* (2013.01); *F03G 7/005* (2013.01); *F03G 7/06* (2013.01); *H02N 11/006* (2013.01); *B32B 2307/40* (2013.01); *C09K 2019/0425* (2013.01); *C09K 2019/0437* (2013.01); *C09K 2019/0448* (2013.01); *C09K 2019/2035* (2013.01); *C09K 2019/2078* (2013.01); *C09K 2019/3425* (2013.01); *C09K 2219/00* (2013.01)

(58) Field of Classification Search
CPC ........ C09K 19/2007; C09K 2019/0448; C09K 2019/2035; C09K 2219/00; C09K 2019/2078; C09K 2019/3425; C09K 2019/0425; C09K 2019/0437; B29C 70/00; B32B 7/023; B32B 27/08; B32B 2307/40; F03G 7/005; F03G 7/06; F03G 7/008; F03G 7/061; F03G 7/0613; F03G 7/0612; F03G 7/009; H02N 11/006
See application file for complete search history.

(56) References Cited

U.S. PATENT DOCUMENTS

| | | | |
|---|---|---|---|
| 2008/0264058 A1 | 10/2008 | Broer et al. | |
| 2009/0069528 A1 | 3/2009 | Yasuda et al. | |
| 2011/0230736 A1 | 9/2011 | Tepper et al. | |
| 2012/0175520 A1 | 7/2012 | Zimdars | |
| 2012/0175529 A1 | 7/2012 | Naciri et al. | |
| 2013/0269336 A1* | 10/2013 | O'Connell | F03G 7/00 60/527 |
| 2014/0290834 A1 | 10/2014 | Egron et al. | |
| 2015/0315012 A1 | 11/2015 | Wiersma et al. | |
| 2017/0276122 A1 | 9/2017 | Van Den Aker | |
| 2017/0349956 A1* | 12/2017 | Cho | B25J 9/1095 |
| 2018/0100490 A1* | 4/2018 | Ma | F03G 7/06 |
| 2019/0226449 A1* | 7/2019 | Altmikus | F03D 7/024 |

FOREIGN PATENT DOCUMENTS

| | | |
|---|---|---|
| JP | 2008228368 A | 9/2008 |
| JP | 2009-249406 A | 10/2009 |
| JP | 2010-011587 A | 1/2010 |
| JP | 2012-255070 A | 12/2012 |
| JP | 2015-080772 A | 4/2015 |
| WO | 2005/075604 A1 | 8/2005 |
| WO | 2005/113867 A1 | 12/2005 |
| WO | 2011036080 A1 | 3/2011 |
| WO | 2012/118916 A2 | 9/2012 |
| WO | 2015050862 A1 | 4/2015 |
| WO | 2016041807 A1 | 3/2016 |

OTHER PUBLICATIONS

Miyamoto M. et al. in "Fabrication of multilayered photochromic memory media using pressure-sensitive adhesive", Applied Optics 45 (33), pp. 8424-8427 (2006).
Harris et al "Large Amplitude Light Induced Motion in High Elastic Modulus Polymer Actuators"J. Mat. Chem. 2005, 15, 5043.
Lui, Photo-Switchable Surface Topologies in Chiral Nematic Coatings: Angew. Chem. Int. Ed. 2012, 51,p. 892-896.
Cheng et al "Fully Plastic Microrobots which Manipulate Objects using Only Visible Light" Soft Matter, 2010, 6, 3447-3449.
Yamada et al "Photomobile Polymer Materials: Towards Light Driven Plastic Motors" Angew. Chem. Int. Ed. 2008, 47, p. 4986-4988.
David H. Wang et al "Impact of Backbone Rigidity on the Photomechanical Response of Glassy, Azobenzene-Functionalized Polyimides" Macromolecules 2014, 47, 659-667.
M. Kondo et al "Effect of Concentration of Photoactive Chromophores on Photomechanical Properties of Crosslinked Axobenzene . . . " J. Mater. Chem., 2010, 20, 117-122.
D. L. Thomsen, P. Keller, J. Naciri, R. Pink, H. Jeon, D. Shenoy and B. R. Ratna, Liquid Crystal Elastomers with Mechanical Properties of a Muscle' Macromolecules, 2001, 34, 5868-5875.
M. Camacho-Lopez, H. Finkelmann, P. Palffy-Muhoray and M. Shelley, "Fast liquid-crystal elastomer swims into the dark " Nat. Mater., 2004, 3, 307-310.

* cited by examiner

ACTUATOR DEVICE, ACTUATION METHOD AND MANUFACTURING METHOD

CROSS-REFERENCE TO PRIOR APPLICATIONS

This application is the U.S. National Phase application under 35 U.S.C. § 371 of International Application No. PCT/EP2017/073388, filed on Sep. 18, 2017, which claims the benefit of EP Patent Application No. EP 16189915.8, filed on Sep. 21, 2016 and EP Patent Application No. EP 17158318.0, filed on Feb. 28, 2017. These applications are hereby incorporated by reference herein.

FIELD OF THE INVENTION

This invention relates to a device with an actuator that can be actuated by light. The invention also relates to an actuation method and manufacturing method.

BACKGROUND OF THE INVENTION

Electroactive materials, which turn electrical energy into mechanical action, have been investigated for a number of applications. However, such materials can require relatively high voltages which can discourage their use in some applications such as in devices to be used in or near the body. Catheter steering and 'soft robotics' (e.g. garments that help to move patients) can require high voltages but use of such high voltages inside or close to the body of a patient can pose electrical safety concerns.

Photoresponsive actuators have been developed which are able to turn light into mechanical action. Photoresponsive materials can be constructed from a film, or from nano- or micrometer size particles. See for example US20080258108, US20090069528, JP2008-228368 or US 20120175520. Such materials can comprise a film or particles of a polymer network of liquid crystalline species containing photoresponsive moieties such as derivatives of azobenzene. Azobenzene groups can photoisomerise between E and Z (cis and trans) isomers upon irradiation with light of different wavelengths and irradiation of such films or particles can thus cause a chemical structural change within constituents of a film or particle including such azobenzene groups. This change in turn induces a change of volume and or shape (deformation) of the film or particles, which may be result in a macroscopic mechanical deformation of the film or particles by e.g expansion or contraction.

Actuators of this class should theoretically be able to exert forces comparable to human muscle fibers upon their irradiation with actuation light. However, in practice control of actuation with light is generally not precise and/or the total actuation output (force) appears to be limited.

SUMMARY OF THE INVENTION

There is a need for an actuator device with improved properties. It is an object of the invention to at least partly fulfill this need.

This object is achieved with the device as defined by the independent claims. The dependent claims provide advantageous embodiments.

The actuator body thus includes at least one pair of photoresponsive layers that each provides actuation upon receipt of actuation light and a non-photoresponsive light guiding layer (e.g. layer) in between the pair of photoresponsive layers that guides and provides actuation light to the photoresponsive layers. The non-photoresponsive layers thus are light guiding layers.

The inventors realized that the total force of an actuator is in practice limited by the thickness of the photoresponsive portion (e.g. prior art polymer film) where thin portions cannot exert enough force to be practically useful for actuation. However, while thicker films should be able to provide increased force, it appears that such films will bend somewhat due to the photoresponsive material closer to the light source responding more or faster than photoresponsive material further away from the light source (deeper into the film). This is because the deeper lying material receives less light due to the fact that the light induced activation is based on an absorptive process with a relatively high extinction of the photoresponsive and/or other material of the film. This bending effect can be considered to be somewhat analogous to the behavior of a bimetallic strip. Even thicker films or films with increased absorption coefficient will not deform at all since the photoresponsive material which receives appreciable light is not sufficient to effect movement of the total film; the unirradiated bulk of the film thus negates the deformation of the irradiated areas.

Hence the setup of the claimed device provides an increased output using only one light guide and thinner layers of photoresponsive material. Furthermore, the light guide can be used to deliver the light at exactly the spot needed. This is an improvement over an actuator that needs external irradiation.

The actuator can be constructed to have multiple of such pairs of photoresponsive layers with a light guide in between for providing their actuation output in a cooperative way so that their combined output provides the actuator output as a high actuation output even though an individual pair output may be low due to the fact that photoresponsive portion(s) may be thin to avoid substantial disadvantages associated with the absorptive actuation process. The device thus allows improved drive control and/or increased total actuation output. The device also enables use of highly absorptive photoresponsive layers in optically activated actuators by reduction of layer thickness while increasing the number of pairs of photoresponsive layers.

The light can be provided by a light source. The non-photoresponsive layers has the following characteristics. They are capable of guiding the incident light with little to no absorption of it to the photoresponsive layers and thus act as light guiding layers. Whilst the layers closer to the light source will deform more than those further away due to attenuation of the light as it passes through progressively more layers, the deformable non-photoresponsive layers, which partition adjacent photoresponsive layers, guide non-absorbed light between and/or to the photoresponsive layers. The deformable non-photoresponsive layers may guide light between the photoresponsive layers either directly between the layers in the stacking direction, or in between the layers in a direction perpendicular to the stacking direction so as to e.g. better distribute light, and/or by guiding light via parts of the non-photoresponsive layers disposed at the peripheries of the layer stack. The latter parts of light guiding layers, may not include photoresponsive layers, such that light may also enter the photoresponsive layer stack from a direction perpendicular to the stacking direction. Having such light guiding layers may thus enhance the overall supply of light to the stack with resulting increase of mechanical action. Also, the light guiding layers may enhance the timing of light supply to all parts of the stack such that mechanical action is better controlled and possibly without undesired bending.

Apart from the optical characteristics, the light guiding layers are also deformable layers where the deformability is such that the layers follow the deformation of the photoresponsive layers induced by their irradiation with actuation light and allow a combination of all of the deformations of the photoresponsive layers to be utilized. To avoid loss of the force generated by the deformation of the photoresponsive layers, the deformable layers should be sufficiently elastically or plastically deformable such that the movement of the photoresponsive layers is (easily) followed by the light guiding layers.

The light guide layers are for example 'non-photoresponsive'. By this is meant that attenuation of light in a non-photoresponsive layer, and therefore the chemical or physical response to that light, is less than the attenuation of light in the photoresponsive layers, for example less than 30% or 10% or 5%. Thus, it is used as a relative term with reference to the photoresponsive layers. Such non-photoresponsive layers absorb less of (and therefore respond less to) the incident light.

The light guide layers may be transparent layers, but they could equally have scattering or refracting properties so that they area opaque for the actuation light. Ideally, they have low absorption of light. Thus, the light guide layers and non-photoresponsive layers are layers which either do not absorb any incident light, or may absorb a small amount of incident light relative to the photoresponsive layers.

A photoresponsive layer comprises a photoresponsive material having photoresponsive properties such that this material makes the layer deform when irradiated. The photoresponsive layer can entirely consist of such photoresponsive material, but there may be other materials present. There may be a single type of photoresponsive material, but there may also be a composition comprising multiple different photoresponsive materials. The photoresponsive material can also comprise a non-photoresponsive carrier material having mixed, dispersed or dissolved therein one or more of the photoresponsive materials. The different photoresponsive materials can be chosen such that they respond to the same irradiation frequency and/or intensities with different or the same mechanical effect. Spatial distribution over the stack of such different materials can then be used to make the stack provide different mechanical actuation when irradiated with the same irradiation. Alternatively, they can be chosen to respond to different radiation. This provides control over the actuation through differentiation of applied irradiation for example with respect to the frequency or intensity of the irradiation provided. When different photoresponsive materials are present different non-photoresponsive layers can be used to provide an actuation radiation to the respective different photoresponsive layers.

The photoresponsive layers may each comprise at least one liquid crystalline component and at least one photoresponsive group. A group can mean entity or molecular substance or a part thereof. A group can mean a part of a molecular substance.

Large anisotropic deformations are possible in liquid crystalline components which may result in significant mechanical force being exerted upon irradiation with light of an appropriate wavelength. The deformation of liquid crystalline components is also reversible which allows light-induced deformation of the photoresponsive layers to be reversed via thermal and/or photochemical means.

The thickness of one or more of the photoresponsive layers may be 1 to 50 microns. Other thicknesses can be between 1 to 25 microns or between 1 to 10 microns or between 1 to 5 microns. Thicknesses can also be between 5 to 50 microns, between 10 to 50 microns or between 25 to 50 microns. The thicknesses can be chosen as based on the penetration depth of light in such layers as dependent on absorptive properties of such layers. The absorptive properties can be determined using standard UV-Vis or other spectroscopic means. From such measurement extinction coefficients of the layer can be determined which are linked to the transmission of light of the layers and thus also thickness according to lambert Beers laws.

Photoresponsive layers or films of such dimensions can shrink (and expand) effectively. Photoresponsive layers thinner than 1 micron may exert too little mechanical force. Layers thicker than 50 microns may attenuate too much light such that light cannot reach layers more distal from the light source with the effect that the deformation of the bulk of the layer becomes negligible. Layers thicker than 50 microns may also display a significantly non-uniform deformation due to areas within the layer itself being more distal from the light source receiving less light and consequently undergoing a smaller deformation response than areas within the layer more proximal to the light source.

Photoresponsive layers and light guiding layers can be mechanically attached to each either directly or with intermittent layer (which should be at least partially transparent to incident light. The mechanical attachment can be through glue, chemical bonding or any other kind of bonding. Alternatively, layers are loosely stacked with no mechanical coupling/fixation between them. Instead a mechanical coupling on one or more sides of the stack may be used which fixes the relative positions of at least the plurality of photoresponsive layers. The one or more light guiding layers can be left free, i.e. not fixed to the mechanical coupling, but can also be fixed to the mechanical coupling. They may alternatively or additionally be mechanically fixed to deformable non-photoresponsive layers. The mechanical coupling constrains the layers in the stacking direction, but allows contraction and expansion of the stack.

The mechanical coupling may assist in combining the forces generated by each of the photoresponsive layers as well as assisting in joining the photoresponsive layers to each other and the deformable non-photoresponsive layers.

A mechanical coupling on at least one of the sides of the stack may be used which fixes the relative positions of the photoresponsive layers and deformable non-photoresponsive layers in the stacking direction, but allows bowing of the stack.

The mechanical couplings may thus assist in combining the deformations of the photoresponsive layers in order to provide an overall bowing or bending of the stack, as well as assisting in joining the photoresponsive layers to each other and the light guiding layers.

The mechanical coupling may comprise or consist of a polymer such as an acrylate polymer.

Acrylate polymers may provide the requisite stiffness for the mechanical coupling and can be straightforwardly fabricated using thermal or photochemical polymerization of acrylate monomers.

The at least one photoresponsive group may be at least one of cinnamic acid-derived, cinnamylidene-derived, spiropyran-derived and azobenzene-derived groups.

The physical change of the photoresponsive group may be on a molecular level such as a light-induced isomerization also referred to as a photoisomerization. Cinnamic acid-derived, cinnamylidene-derived, spiropyran-derived and azobenzene-derived groups may undergo such light-induced physical changes.

The photoresponsive layer may comprise at least one of a liquid crystalline component which is curable, such as an acrylate-functionalized liquid crystalline component, and a polymer of a curable liquid crystalline component.

A liquid crystalline component which is curable permits the liquid crystalline components to be polymerized or cross-linked. A liquid crystalline component which is curable may be attached to another curable group. The polymer or homopolymer of a curable liquid crystalline material can be formed by polymerizing or cross-linking (also called curing) two or more of the curable liquid crystalline components. This can be achieved by the curable liquid crystalline component being functionalized with a curable group such as an acrylate group. By polymerizing or cross-linking the curable liquid crystalline components, the molecular ordering/alignment properties of liquid crystals may therefore be combined with the elastic properties of an elastomeric polymer network.

The deformable non-photoresponsive layer may be a polymer or rubber such as a silicone-based polymer or rubber. Silicone-based polymers or rubbers may possess the requisite properties of the deformable non-photoresponsive layers in terms of low light attenuation and low elastic modulus. Such polymers can also be straightforwardly fabricated using thermal or photochemical polymerization of suitable silicone-based monomers.

The device may further comprise one or more light sources for providing the incident light. The one or more light sources can be provided at the top and/or bottom of the layer stack and/or at one or more edges of the layer stack. The one or more light sources can be integrated in the mechanical couplings. One or more light sources freely disposed but capable of irradiating the layer stack can be used. Alternatively, the light source can be for providing the incident light to a further light guide such as an optical fibre that in turn is capable of coupling the light to the deformable non-photoresponsive layers. This provides opportunity to locate the light sources remote from the actuator device while being capable of giving locally confined light input as compared to the freely disposed light sources. There are thus different options for providing the controlling of incident light.

According to another aspect of the invention, there is provided a method of manufacturing an actuator device.

In one example, the method comprises forming a stack of layers by layering photoresponsive layers between spacers therewith forming interlayer spaces (which could be called interlamellar spaces), filling the interlayer spaces, and optionally coating one or more sides of the stack, with curable material(s) such as a silicone material and/or an acrylate material and curing the curable material(s) using thermal and/or photochemical polymerization.

In an alternative example, the method comprises forming a stack of layers by coating photoresponsive layers with a curable material such as a silicone material and/or an acrylate material, stacking the coated layers, optionally coating one or more of the sides of the stack with a curable material such as a silicone material and/or an acrylate material, and curing the curable material(s) using thermal and/or photochemical polymerization.

In accordance with another aspect of the invention, there is provided an actuation method, comprising illuminating a stack of layers comprising a plurality of photoresponsive layers which are partitioned by deformable non-photoresponsive layers between each adjacent pair of photoresponsive layers thereby effecting deformation of the photoresponsive layers, and causing the deformable non-photoresponsive layers to follow the deformation of the photoresponsive layers, inducing averaging of the deformation of the photoresponsive layers.

BRIEF DESCRIPTION OF THE DRAWINGS

Examples of the claimed device will now be described in detail with reference to the accompanying schematic drawings, in which:

DETAILED DESCRIPTION OF THE EMBODIMENTS

The claims define an actuator device comprising an actuation structure that can provide actuation based on the presence of a photoresponsive portion which, when it receives actuation light, can deform and a light guiding layer, i.e. a light guide for guiding and providing the actuation light to the photoresponsive layer. The actuation structure is constructed such that the photoresponsive portion is illuminated more efficiently than a photoresponsive portion of the same volume and incorporated in an actuation structure. Hence, an improved actuation output (stroke and/or strain) can be obtained with a particular volume of photoresponsive portion.

Whilst the layers closer to the light source will deform more than those further away due to attenuation of the light as it passes through progressively more layers, deformable non-photoresponsive layers (light guiding layers) are provided which partition adjacent photoresponsive layers. They guide unabsorbed light between the layers and also enable light to be coupled in from the sides. They follow the deformation of the layers. Thus the greater and lesser deformations of the photoresponsive layers depending on their proximity to the light source are combined into an overall mechanically useful stack deformation. To avoid loss of the force generated by the deformation of the photoresponsive layers, the deformable non-photoresponsive layers are sufficiently deformable such that the movement of the photoresponsive layers is easily followed by the deformation of the non-photoresponsive layers.

The light guiding layers may be elastically or plastically deformable. In both cases the amount of energy needed to deform any light guiding portion should be relatively low compared to the work to be performed by the photoresponsive portions.

The device as claimed herein will be described with reference to the below examples.

Figure 1:
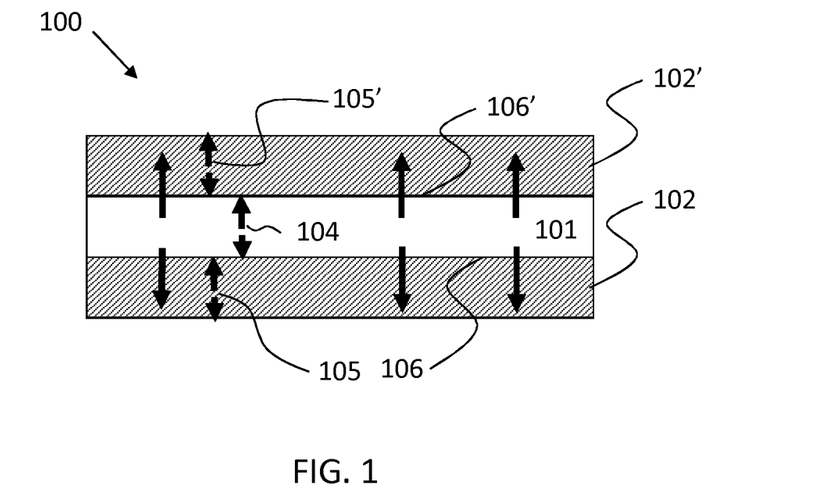
FIGS. 1 to 3, 4, 6 and 8 show respective examples of a device according to the invention.

In a first example, the actuator structure 100 of FIG. 1 comprises a light guiding layer 101 sandwiched between photoresponsive layers 102 and 102'. The three layers form a stack of layers. The photoresponsive layer 102 has a first surface 106 facing a first direction and facing the light guiding layer 101 from one side and a second surface 106' facing a second direction opposite to the first direction and facing the light guiding layer 101 from another side as the one side. The light guiding layer 101 provides light through these surfaces to the photoresponsive portion in e.g. at least two opposite directions 103 and 103'. The light guiding layer 101 has a thickness 104 and the photoresponsive layers 102' and 102, respectively have thicknesses 105' and 105 all measured in the stacking direction. Thus, in this example the light guiding layer provides the actuation light to different photoresponsive layers. This example is advantageous with respect to a device (not shown) where there is only one photoresponsive layer which is the thickness of the sum of the thicknesses 105 and 105' (the actuation output is roughly dependent on volume of photoresponsive material) in combination with the light guiding layer providing light from only one side of the photoresponsive layer. This is due the fact that the actuation is based on an absorptive process of actuation light and the arrangement of the invention thus leaves more light (less absorption) for use of actuation of a larger part of the total photoresponsive portion in the structure. Also the invention provides more uniform illumination of the photoresponsive portion. Less intense sources may be used for this kind of setup.

Figure 2:
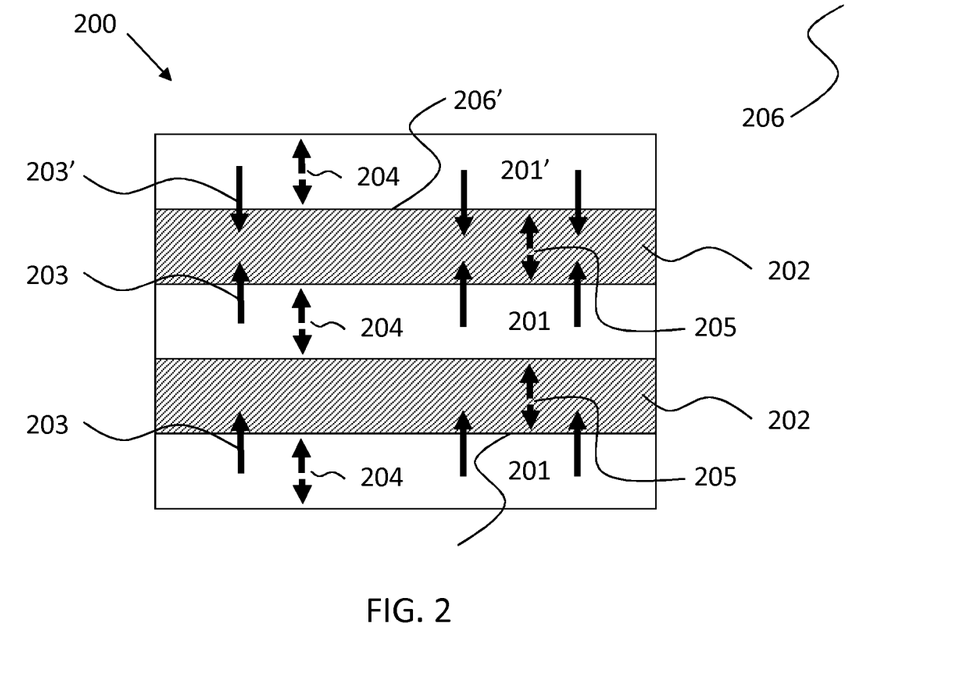

FIG. 2 shows an actuator having more than one light guiding layer 201, 201'. The outer light guiding layers provide illumination of the photoresponsive layers from a further side 203 or 203'. The outer light guiding layers could also include or be replaced with mirrors reflecting any actuation light form layer 201 in the middle that has not been absorbed during use by the photoresponsive layers.

The examples of FIGS. 1 and 2 were explained with a structure having layers, stacked along one axis. The layers need not be continuous, but may be patterned. For example, with an implementation as in FIG. 3 which shows an actuation structure 300 including a body of photoresponsive material 302 having embedded therein four light guiding parts (sub-portions) 301, 301', 301", and 301'". The parts 301 and 301' may be seen as belonging to one patterned light guiding layer stacked in the 304 direction and patterned in the 306 direction and the same holds for the parts 301" and 301'". The body has corresponding layers of photoresponsive material in between the patterned light guiding layers. Each of these parts emits light into the body 302 along at least directions 304 and 306.

Figure 3:
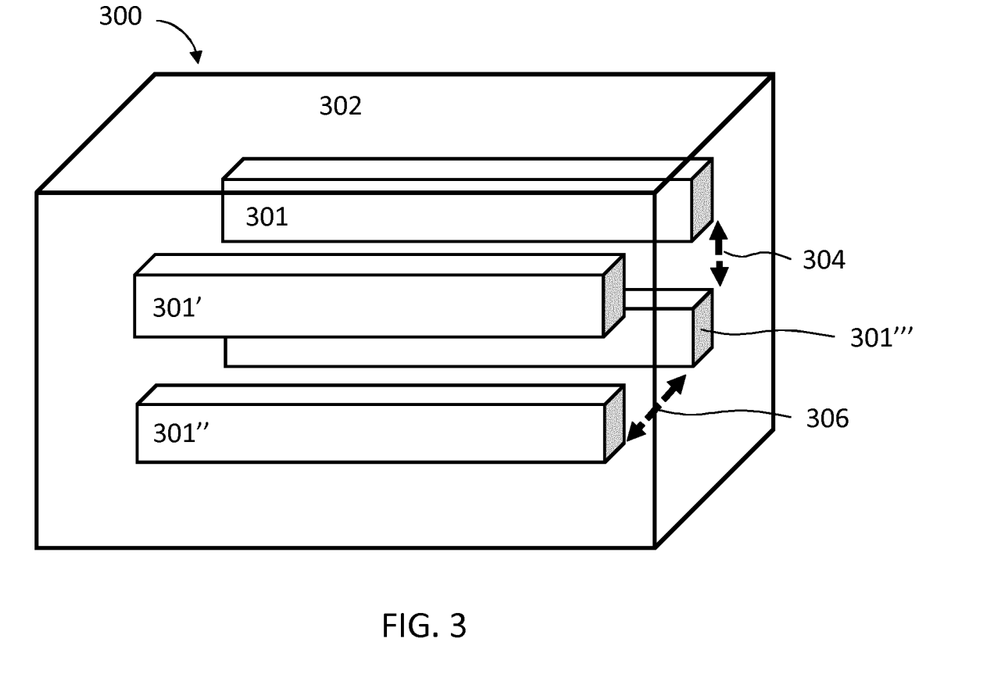

Although not shown, in a similar fashion the reverse situation may also be implemented in which 301, 301' 301" and 301'" form patterned photoresponsive layers while the body 302 is a light guiding layer.

Figure 4:
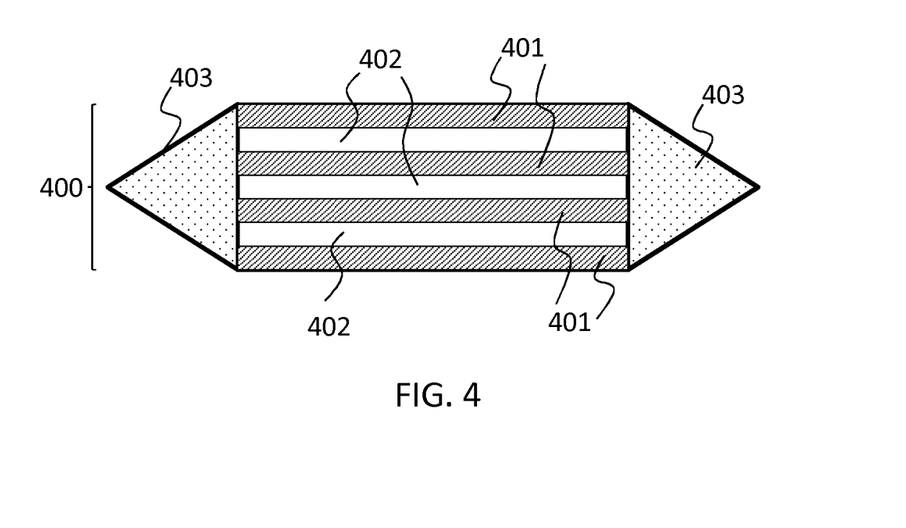
Figure 5:
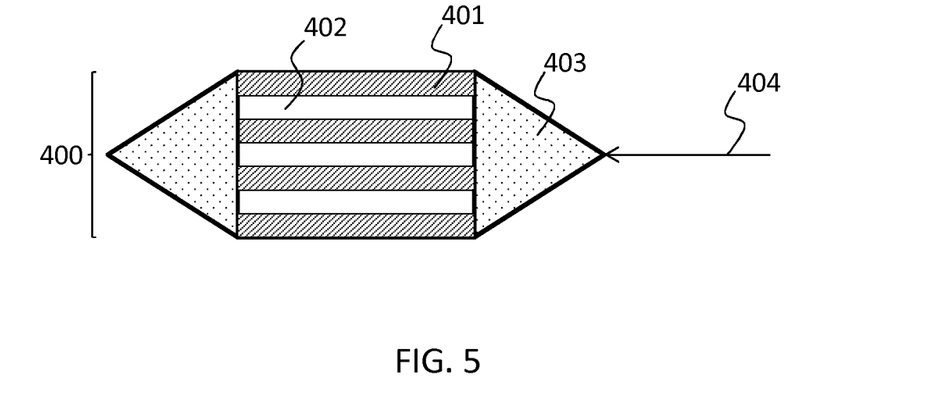
FIG. 5 shows the actuator device of FIG. 4 undergoing deformation in response to actuation light from a light source.

Another device 400 according to the invention includes a stack of layers as shown in FIG. 4. The stack comprises photoresponsive layers 401 sandwiching light guiding layers 402. The layers are connected by mechanical couplings 403. The couplings may for example clamp together the ends of the stack. Other ways of coupling using gluing or the like can be used. The same stack is shown in FIG. 5 in which it is undergoing deformation in response to activation using activation light. In this case the activation brings about a length contraction of the device perpendicular to the stacking direction. The contraction is due to the molecular changes in the photoresponsive materials as described hereinbefore. The contraction can be used as an actuation in the form of its stroke or strain.

The light guiding layers can be made of many materials as will be elucidated below.

Figure 6:
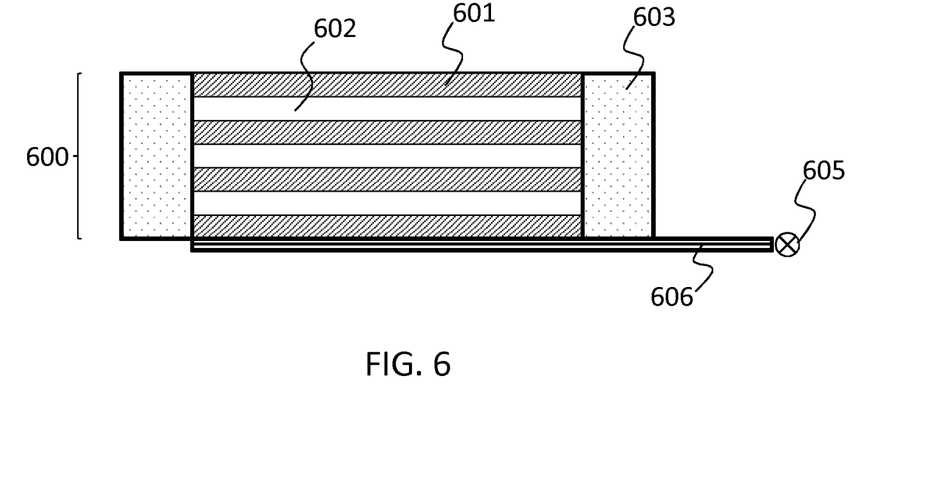
Figure 7:
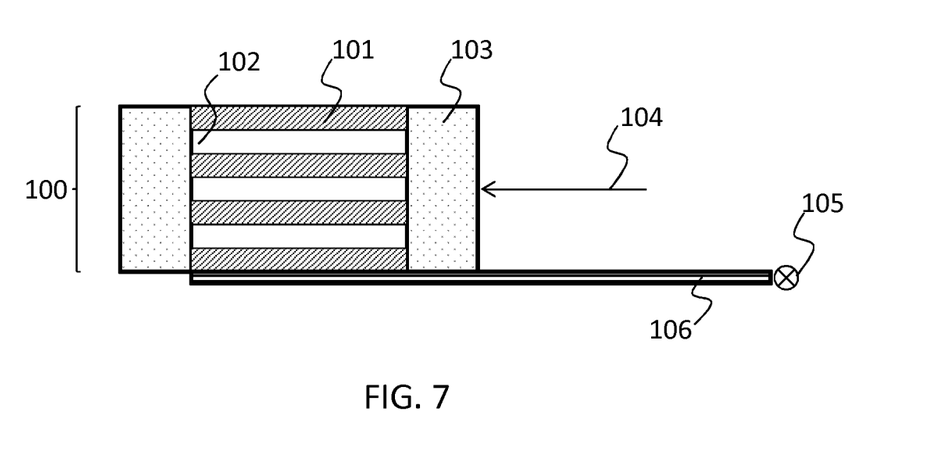
FIG. 7 shows the actuator device of FIG. 6 undergoing deformation in response to actuation light from a light source.

FIG. 6 shows a stack 600 comprising photoresponsive layers 601 separated by deformable light guiding layers 602 which are connected by mechanical couplings 603 but also shows a light source 605 and a light coupler 606 which acts as a conduit for the light between the light source 605 and the stack 600. The same stack 600 is shown in FIG. 7 in which it is undergoing deformation in response to light such as blue or UV light provided by the light source 605. Thus a mechanical force 604 is produced by the stack 600.

FIGS. 6 and 7 show the light source at the bottom of the stack. Illumination may instead be provided to the top and the bottom. The light intensity at each photoresponsive layer 601 will inevitably be different. However, a more constant illumination for each photoresponsive layer will result from illumination from the top and the bottom. The mechanical couplings 603 constrain the layers to deform laterally by the same amount. This means there will be internal stresses within the structure which will reduce the illumination-to-force conversion efficiency. However, the generated output force will exceed that which is possible from a single layer (or smaller number of layers) of the same overall thickness.

The light providing portion may be attached to the photoresponsive portions through the surfaces through which the light is provided to the photoresponsive portions. Alternatively, they may not be attached. This provides moveability. For example in the configurations of FIGS. 5 and 6 sliding (with or without lubrication) can be implemented and hence the actuation induced through deformation of photoresponsive parts is least opposed by the light providing parts.

In the examples above, preferably the light source, or a plurality of light sources is located in the mechanical couplings so that light form these sources can be provided to the light guiding layers which act as light guides to distribute the light and provide it to the photoresponsive portion and sub-portions of the stack. The light guiding portions may have light scattering properties if operating as light guide. Hence, scattered light entering the light guiding layers form a source are guided and scattered to exit the light guiding layer towards or into the photoresponsive portions. Light guiding layers or portions/sub-portions are thus preferably made from light scattering materials such as opaque materials. One example is siloxane or silicone rubber. Other compliant layers can be used.

Figure 8:
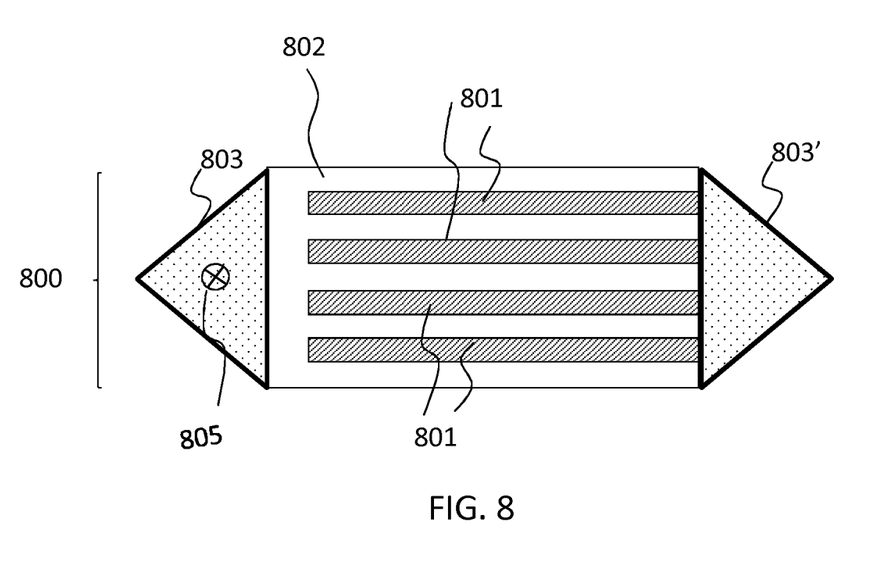

FIG. 8 shows an exemplifying device 800 including a light guiding portion 802 having multiple sub-portions in the form of layers where between these layers there are layers (sub-portions) 801 of photoresponsive material. There are mechanical couplings 803 and 803' of which the first one is transparent for the light of the LED light source 805 it contains. The light of the LED when activated enters the light guiding portion 802 to activate the photoresponsive parts by guiding the light to in between the layers 801 and outcoupling the light to these layers. The device of FIG. 8 includes light guiding layers on the bottom and top of the stack so that all photoresponsive layers are provided with similar amounts of light. This is preferred and can be used in the other devices as well.

In one set of examples, the structure may be designed to avoid bowing and provide a linear, in-plane, actuation by constraining the layers so that they cannot deform out of plane. Thus, the examples above show light-induced deformation in one direction but this should not be construed as limiting the stack to only such deformations in one in-plane dimension. If the layers are not attached to each other in the stacking direction, sliding can happen and optimized force output realized as described herein before. No compliant material needs to be used in such cases as the light providing layers do not need to comply with the actuation induced shape or size change induced by the photoresponsive portion.

Figure 9:
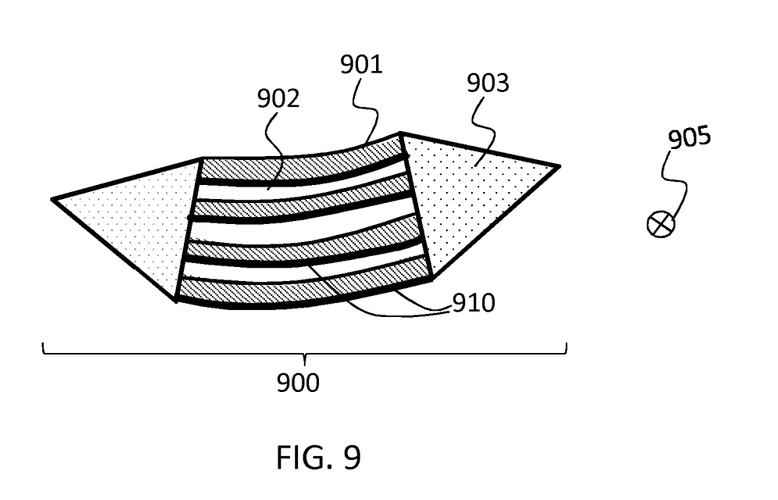
FIG. 9 shows an actuator device according to the invention undergoing a bowing actuation in response to actuation light directed to one side of the photoresponsive layers of the device.

Alternatively, FIG. 9 shows a deformation of the stack where incident light induces bowing of the stack.

To induce the bowing behavior, the photoresponsive layers are coated with a light absorbing (black) layer 910 on one side. This means the photoresponsive layers 901 (which in this example could be thicker than 30 micrometers) can only be irradiated from one face (e.g. from above in the configuration shown in FIG. 9). There may then be an intensity gradient obtained through the layer thickness due to the high absorption in the photoresponsive layer 901. This gradient will make the isomerization asymmetrical and thus bending will occur as a result of an internal bimetal effect. If the backings are attached to the photoresponsive layers, such gradient is not needed. As long as the backing is not photoresponsive in the same amount as the photoresponsive layers. Again actuation will have the ensemble of photoresponsive layers and backing behave like a bimetal effect.

In FIG. 9, the stack 900 is illuminated by a light source 905 from one lateral side, since light can no longer propagate through the stack in the vertical stacking direction. The asymmetrical absorbance of light explained above results in a large effective bowing of the stack.

Alternatively, the bowing shown in FIG. 9 may be achieved by employing photoresponsive layers comprising a twisted molecular structure with two perpendicular orientations of (rod-like) mesogenic groups of the liquid crystalline component, with the twist effected in the vertical stacking direction. Bowing will result from irradiation as one side contracts and the other side expands. This avoids the need for light blocking layers, and thus enables illumination in the vertical and/or lateral directions. Bowing behavior may be further encouraged by employing photoresponsive layers with a larger individual thickness, for example of 30 to 50 microns.

The mechanical couplings 103 may also be used to couple light laterally into the photoresponsive layers, to improve the uniformity of illumination, and thereby reduce internal stresses, increase the conversion efficiency and, if desired, reduce the tendency for the structure to bow rather than expand or contract linearly.

One way to provide lateral light coupling is to provide light from the top and/or bottom, and to use the mechanical couplings as reflectors for redirecting the light from the stacking direction to the lateral direction. A prism shaped structure as shown in e.g FIGS. 4 and 5 may be used for this purpose, making use of either a specular reflecting surface or total internal reflection.

Alternatively, there may be light sources mounted at the edges of the stack (as shown in FIG. 9) instead of, or as well as at the top and/or bottom.

The light may be provided by a local light source which is part of the actuator device, for example as shown in FIGS. 4 and 5. However, the light may instead by provided from a remote source directed at the actuator device across free space or through another medium that serves as light guide. Hence, the actuation structure can include further light guides (e.g. in the form of tubular light guide wires) that provide actuation light to the light guiding portions. Hence with this remote controlling via light wires is enabled.

The light guiding portions (e.g. the layers) in an actuator structures may have the same or different dimensions (e.g. thickness). Preferably the dimensions (e.g. 104 and 105, or 205 and 204 or 304 and 306), which may be thicknesses in case of layers, are in the range 1 micron to 50 microns. Photoresponsive layers or films of such dimensions can shrink (and expand) effectively.

For example, the dimension of a photoresponsive portion may be between 1 and 10 microns. In case of unsubstituted azobenzene based photoresponsive materials (e.g. Formula 4) or photoresponsive materials with comparable extinction at the actuation wavelength, this dimension may be 5 microns as this provides a favorable balance between providing effective shrinking (and expanding) behavior whilst allowing unabsorbed light to pass to other photoresponsive layers of the stack.

Alternatively, a photoresponsive portion with a thickness of 30 to 50 microns may be employed if bowing is preferred over linear expansion and contraction. Also, if extinction is reduced at the actuation wavelength, then thicker portions of photoresponsive portions can be used. This will increase mechanical output of a device and improve to facilitate manufacturability.

The thickness of a light guiding portion or sub-portion may be, for example, between 5 and 20 microns. A dimension in this range results in a deformable light guiding layers which is sufficiently thin to follow easily the deformations of the photoresponsive layers whilst being sufficiently thick to guide light between and to the photoresponsive layers.

The number of photoresponsive layers in the stack may be between 2 and 50, for example between 2 and 30 or for example between 2 and 20. Thus the height of the stack may be between 3 microns and about 1 mm.

For example, for a stack comprising 10 photoresponsive layers with a 10 micron thickness with a deformable non-photoresponsive layer thickness of 20 microns, the height of the stack is 0.3 mm.

The length and breadth of the stack is dependent upon the intended application and as such these dimensions may range from the order of millimeters to centimeters.

It will be clear from the Figs. that the shape of the mechanical couplings is not especially limited and can be, for instance, prismatic or cuboidal. The mechanical couplings may comprise a connection which extends in the stacking direction to connect all of the layers in the stack, so that the deformations of the individual actuators are combined in a total deformation of the stack. In this way, the mechanical coupling fixes the relative positions in the stacking direction, but allows contraction and expansion, or bowing of the stack.

Alternatively, or additionally, the light guiding portions/sub-portions and photoresponsive portions/sub-portions may be mechanically connected to each other via their interface either directly or through additional layers. This may for example be done using glue.

Without wanting to be bound by theory, in the example where the portions are layers such that there is a stack of a light guiding (light guide) layer and a photoresponsive layer and both are elastically deformable, the elastic modulus of the light guiding layer (E1) is preferably equal to or lower than the elastic modulus of the photoresponsive layer (E2). The modulus of the light guiding layer (E1) can be related to the modulus of the photoresponsive layer (E2) according to Equation 1:

$$E1 = <k*E2*(d_1/(d_1+d_2)) \qquad \text{Equation 1}$$

Where $d_1$ and $d_2$ respectively correspond to the thickness of the photoresponsive layer and light guiding layer and where k is a constant factor. Preferably, k is equal to or smaller than a value chosen from the group consisting of: 1, 0.5, 0.25, 0.1, or 0.05. A preferred value of k is 0.1. For example, for a photoresponsive layer with an elastic modulus in the order of 1000 MPa, a suitable value for the elastic modulus of the light guiding layer is then in the order of 100 MPa. An elastic modulus of 100 MPa corresponds to a hardness of 60 ShoreA in the case of a silicone elastomer material.

Assuming that the elastic modulus of the deformable light guiding layer is very low (so that we may neglect it in calculations) the maximum force (F) that can be exerted by the combined layers of the stack may be approximated by (Equation 2):

$$F = \Phi n A \{d_1/(d_1+d_2)\} \quad \text{Equation 2}$$

Where $\Phi$ is the stress of the photoresponsive layer, n is the number of photoresponsive layers, A is the cross-sectional area of the total multilayer stack and $d_1$ and $d_2$ correspond to the thickness of the photoresponsive layer and light guiding layers respectively.

A photoresponsive group of a photoresponsive portion responds to light by exhibiting an effect which may be on a molecular level such as a light-induced isomerization or chemical reaction such as e.g. a chemical dimerization. An isomerization means that the elemental composition of the photoresponsive group is unchanged but the spatial arrangement of the atoms of the molecule changes on undergoing this process. This isomerization or reaction may change the shape of the molecule(s) which can alter the arrangement/ordering of species immediately surrounding and/or attached to the involved molecule(s) In this way the molecular response of the photoresponsive group(s) to actuation light triggers a macroscopic structural change/deformation of the photoresponsive portion.

The effect of light on an azobenzene-derived group may be the well-known isomerization of the molecule between cis and trans isomers; these isomers differing in respect to the arrangement of aryl rings either side of the N=N double bond. The more stable trans isomer of an azobenzene-derived group is converted to the cis isomer upon irradiation with UV or near-UV (blue) light (Equation 3 below) and FIG. 10. Longer wavelength visible light such as green light may be employed for the reverse process. Thermal energy may also or alternatively be used for the reverse process due to the thermodynamic preference for the trans isomer.

Equation 3

It is the so called n–π* transition with associated wavelength range that is responsible for the E-Z isomerisations.

The photoresponsive portion/sub-portion may for example comprise at least one liquid crystalline component. Such materials are useful for turning light into mechanical action since the effect of the physical change of the photoresponsive group (such as photoisomerization) may influence the order/alignment of the liquid crystalline component(s) resulting in significant macroscopic deformation of the photoresponsive portion. US2008264058 describes such materials and how they are actuated and these materials can be used in the invention. Polymeric liquid crystalline components, also known as liquid crystalline elastomers, derived from liquid crystalline components which are curable, are useful for photoactuation since the mesogenic ordering of the liquid crystalline components can be combined with the elastic characteristics of a polymer network making for large and reversible anisotropic deformations.

Curable liquid crystalline components are well-known per se and may comprise a mesogenic group connected to a curable group via a spacer. Mesogenic groups are well known per se. The mesogenic group may be, for example, a phenyl benzoate-derived group. Curable groups are similarly well-known; for example suitable curable groups may be acrylate groups. One or more curable groups, such as acrylate groups may be used in the curable liquid crystalline component. Spacer groups are also well-known; suitable examples may be alkyl or polymethylene (($CH_2$)$_n$) groups.

Molecules comprising mesogenic group connected to a curable group via a spacer are well-known per se. Non-limiting examples of a curable liquid crystalline component which may be used in the photoresponsive layers of the stack are compounds according to Formulae 1 to 3:

Formula 1

Formula 2     Formula 3

Acrylate-functionalized curable liquid crystalline components such as compounds according to Formulae 1 to 3 display effective mesogenic properties due to a linear rod-like structure and the acrylate group(s) may be employed in polymerization/cross-linking reactions with other curable components such as other curable liquid crystalline components. Also polymerization/cross-linking reactions may occur between the curable liquid crystalline component, such as a compound according to Formulae 1 to 3 and/or the polymers therefrom, with curable polymeric or monomeric photoresponsive groups.

The term photoresponsive group is intended to mean a chemical group or moiety which responds to light. The photoresponsive group responds to light by exhibiting a physical change. The at least one photoresponsive group may be incorporated as part of the at least one liquid crystalline component and/or may be employed separately from the liquid crystalline component. The terms 'incorporated as part of' and 'employed separately from' can be interpreted to mean that chemical bonds respectively join or do not join the photoresponsive group to the liquid crystalline component. The photoresponsive group may itself have mesogenic or liquid crystalline properties such that it can also be a liquid crystalline component. This physical change of the photoresponsive group when illuminated may influence the ordering/alignment of the at least one liquid crystalline component in order to effect a macroscopic change/deformation of the photoresponsive layer.

A photoresponsive group which is curable permits the photoresponsive group to be polymerized or cross-linked, and it may be attached to another curable group. This can be achieved by the photoresponsive group being functionalized with at least one curable group such as an acrylate group. The photoresponsive group may be connected to the curable group using a spacer group such as an alkyl or polymethylene (—$(CH_2)_n$—) group. A suitable photoresponsive group may be azobenzene-derived hence a suitable curable photoresponsive group may be an acrylate-functionalized azobenzene-derived group.

Curable photoresponsive groups comprising a photoresponsive group connected to a curable group via spacer group are well-known per se. A non-limiting example of such a curable photoresponsive group which may be used in the photoresponsive portions of the invention is a compound according to Formula 4:

Formula 4

Where q is the number of methylene groups in the spacer group. For example, q may be equal to 3 or 6.

The diacrylate-functionalized azobenzene-derived curable photoresponsive group according to Formula 4 may itself display mesogenic properties due to its linear rod-like structure. In a non-limiting example, the acrylate groups of the curable photoresponsive group according to Formula 4 may be employed in polymerization/cross-linking reactions with other curable components such as other curable photoresponsive groups, for example other curable photoresponsive groups according to Formula 4 or the homopolymers therefrom.

The photoresponsive layer may be prepared by preparing a mixture of the curable liquid crystalline component, such as one or more of the compounds according to Formulae 1 to 3, and the photoresponsive group, such as a molecule according to Formula 4, aligning the mesogenic groups of the liquid crystalline component, for example using parallel rubbed surfaces, and polymerizing or curing the mixture. The method of polymerization is not especially limited and may be carried out photochemically, thermally, catalytically etc.

The resulting photoresponsive layer may comprise one or more of a photoresponsive group which is curable such as an acrylate-functionalized azobenzene-derived group, a homopolymer of a curable photoresponsive group, a copolymer of a curable photoresponsive group with a curable liquid crystalline component, a copolymer comprising a homopolymer of a curable photoresponsive group and a curable liquid crystalline component, and a copolymer comprising a homopolymer of a curable photoresponsive group with a homopolymer of a curable liquid crystalline component.

The homopolymer or polymer of a photoresponsive group can be formed by polymerizing or cross-linking (also called curing) two or more of the curable photoresponsive groups. In an example, the curable photoresponsive group is incorporated as part of the liquid crystalline component hence a homopolymer of a curable photoresponsive group would advantageously provide photoresponsive properties, the molecular ordering/alignment properties of liquid crystals combined with the elastic properties of an elastomeric polymer network.

Alternatively, the copolymer of a curable photoresponsive group and a curable liquid crystalline component can be formed by copolymerizing or cross-linking (also called curing) one or more of the curable photoresponsive group(s) with one or more of the curable liquid crystalline component(s). The curable photoresponsive group is thereby connected to the liquid crystalline component which may advantageously enhance the effect of the light-induced response of the photoresponsive group on the molecular ordering/alignment properties of liquid crystals and hence on the macroscopic deformation of the photoresponsive layer. Furthermore, the copolymer also favorably includes the elastic properties of an elastomeric polymer network.

Alternatively, the copolymer comprising a homopolymer of a curable photoresponsive group and a curable liquid crystalline component can be formed by copolymerizing or cross-linking (also called curing) at least one of the homopolymers of the curable photoresponsive group(s) with at least one of the curable liquid crystalline component(s). The homopolymer of the curable photoresponsive group is thereby connected to the liquid crystalline component which may advantageously enhance the effect of the light-induced response of the photoresponsive group on the molecular ordering/alignment properties of liquid crystals and hence on the macroscopic deformation of the photoresponsive layer. Furthermore, the copolymer also favorably includes the elastic properties of an elastomeric polymer network.

Alternatively, the copolymer comprising a homopolymer of a curable photoresponsive group and a homopolymer of a curable liquid crystalline component can be formed by copolymerizing or cross-linking (also called curing) at least one of the homopolymers of the curable photoresponsive group(s) with at least one of the homopolymers of the curable liquid crystalline component(s). The homopolymer of the curable photoresponsive group is thereby connected to the homopolymer of the liquid crystalline component which may advantageously enhance the effect of the light-induced response of the photoresponsive group on the molecular ordering/alignment properties of liquid crystals and hence on the macroscopic deformation of the photoresponsive layer. Furthermore, the copolymer also favourably includes the elastic properties of an elastomeric polymer network.

The stack may be used as a single actuator, or else there may be a line or array of the stacks, for example to provide control of a 2D or 3D contour. Such actuator devices may find application in flexible foils for fluidics, catheters, actuators for drug delivery, soft robotics in cushions or garments (such as active pressure stockings) which can give mechanical support to elderly or disabled persons or to help and guide physiotherapy or help to prevent pressure ulcers. Other possible applications are in products which use UV LEDs, for instance oral healthcare (curing of teeth whitening coatings) and photodynamic therapy (for treating psoriasis, acne). Such devices may also be used in photo-catalytic oxidation applications (water and air purification).

The present invention further relates to the fabrication of the stack. In a non-limiting example, the photoresponsive layers or films are prepared in 10 micron cells in which parallel rubbed surfaces are filled with a mixture of the curable liquid crystalline component according to Formula 1 and the photoresponsive group according to Formula 2. After alignment and photopolymerization with the aid of a photo initiator, a 10 micron film is obtained which can be removed from the cell and cut into the photoresponsive layers for the stack.

In one implementation, the 10 micron photoresponsive layers are stacked between 10 micron spacers. The gaps between the photoresponsive layers are then filled with a curable silicone material which can also be applied at the sides of the stack, which may assist in dividing light over several layers. Thus light is guided to the photoresponsive layers both in the stacking direction and perpendicularly to the stacking direction by light being guided via non-photoresponsive material disposed at the peripheries of the stack. The silicone material is then cured to form the silicone polymer/rubber of the deformable non-photoresponsive layers. The extremes of the stack are then connected via a mechanical coupling that is formed from acrylate monomers by thermal or photochemical polymerization.

In an alternative implementation, the photoresponsive layers are coated with 10 micron of uncured silicone material by a technique such as doctor blading. The coated photoresponsive layers are then stacked followed by curing of the silicone material to form a silicone polymer/rubber. Mechanical couplings may be applied before or after curing of the silicone material.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An actuator device comprising:
   a plurality of photoresponsive layers, wherein the plurality of photoresponsive layers deform in response to incident light;
   a deformable non-photoresponsive layer positioned at least partly between each adjacent pair of the plurality of photoresponsive layers,
   wherein the plurality of photoresponsive layers and the deformable non-photoresponsive layers are arranged in a stack, and
   wherein each deformable non-photoresponsive layer guides light between and to the plurality of photoresponsive layers; and
   a mechanical coupling disposed on at least one side of the stack in a stacking direction, wherein the mechanical coupling integrates one or more light sources, and wherein the one or more light sources are arranged to provide the incident light.

2. The actuator device as claimed in claim 1, wherein each of the plurality of photoresponsive layers comprises at least one liquid crystalline component and at least one photoresponsive group.

3. The actuator device as claimed in claim 2, wherein the at least one photoresponsive group is at least one of cinnamic acid-derived, cinnamylidene-derived, spiropyran-derived, and azobenzene-derived groups.

4. The actuator device as claimed in claim 1, wherein the thickness of each photoresponsive layer is 1 to 50 microns.

5. The actuator device as claimed in claim 1,
   wherein the mechanical coupling fixes the relative positions of the plurality of photoresponsive layers and the deformable non-photoresponsive layers in the stacking direction, and
   wherein the mechanical coupling allows contraction and expansion of the stack.

6. The actuator device as claimed in claim 5, wherein the mechanical coupling comprises a polymer, and wherein the polymer is an acrylate polymer.

7. The actuator device as claimed in claim 1,
   wherein the mechanical coupling fixes the relative positions of the plurality of photoresponsive layers and the deformable non-photoresponsive layers in the stacking direction, and
   wherein the mechanical coupling allows bowing of the stack.

8. The actuator device as claimed in claim 7, wherein the mechanical coupling comprises a polymer.

9. The actuator device as claimed in claim 8, wherein the polymer is an acrylate polymer.

10. The actuator device as claimed in claim 1,
    wherein each photoresponsive layer of the plurality of photoresponsive layers comprises a liquid crystalline component, and
    wherein the liquid crystalline component is curable.

11. The actuator device as claimed in claim 1, wherein the deformable non-photoresponsive layer comprises a polymer or rubber.

12. The actuator device as claimed in claim 1,
    wherein one or more other light sources are provided at the top and bottom of the stack of the plurality of photoresponsive layers and the deformable non-photoresponsive layers.

13. The actuator device as claimed in claim 1, wherein a photoresponsive layer of the plurality of photoresponsive layers comprises an acrylate functionalized liquid crystalline component.

14. The actuator device as claimed in claim 1,
    wherein the one or more light sources are provided at said at least one side of the stack of the plurality of photoresponsive layers and the deformable non-photoresponsive layers.

15. A method of manufacturing an actuator device, the method comprising:
- providing a plurality of photoresponsive layers, wherein the plurality of photoresponsive layers deform in response to incident light;
- disposing a respective deformable non-photoresponsive layer at least partly between each adjacent pair of the plurality of photoresponsive layers,
- wherein the plurality of photoresponsive layers and the deformable non-photoresponsive layers are arranged in a stack,
- wherein each deformable non-photoresponsive layer guides light between and to the plurality of photoresponsive layers,
- wherein a mechanical coupling is disposed on at least one side of the stack in a stacking direction,
- wherein the mechanical coupling integrates one or more light sources, and
- wherein the one or more light sources are arranged to provide the incident light.

16. The method as claimed in claim 15, further comprising:
- stacking the plurality of photoresponsive layers between interlamellar spacers;
- filling the interlamellar spaces with at least one curable material; and
- curing the at least one curable material.

17. The method as claimed in claim 15, further comprising:
- coating the plurality of photoresponsive layers with at least one curable material;
- stacking the coated plurality of photoresponsive layers; and
- curing the at least one curable material.

18. The method as claimed in claim 15, further comprising:
- stacking the plurality of photoresponsive layers between interlamellar spacers, wherein the stack has one or more sides;
- filling the interlamellar spaces, and coating at least one of the one or more sides of the stack, with at least one curable material; and
- curing the at least one curable material.

19. The method as claimed in claim 15, further comprising:
- coating the plurality of photoresponsive layers with at least one curable material, wherein the stack has one or more sides;
- stacking the coated plurality of photoresponsive layers, and coating at least one of the one or more sides of the stack with the at least one curable material; and
- curing the at least one curable material.

* * * * *